United States Patent
Venhaus (10) Patent No.: US 10,697,617 B2
(45) Date of Patent: Jun. 30, 2020

(54) LUMINAIRE UPLIGHT

(71) Applicant: Hubbell Incorporated, Shelton, CT (US)

(72) Inventor: David Venhaus, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/971,473

(22) Filed: May 4, 2018

(65) Prior Publication Data
US 2018/0320866 A1 Nov. 8, 2018

Related U.S. Application Data (60) Provisional application No. 62/502,190, filed on May 5, 2017.

(51) Int. Cl.
| | |
|---|---|
| *F21S 8/00* | (2006.01) |
| *F21V 21/02* | (2006.01) |
| *G02B 27/09* | (2006.01) |
| *G02B 19/00* | (2006.01) |
| *F21V 7/00* | (2006.01) |
| *F21V 15/01* | (2006.01) |

(52) U.S. Cl.
CPC .............. *F21V 21/02* (2013.01); *F21S 8/033* (2013.01); *F21V 7/0016* (2013.01); *G02B 19/0028* (2013.01); *G02B 19/0066* (2013.01); *G02B 27/0955* (2013.01); *F21V 7/0083* (2013.01); *F21V 15/01* (2013.01)

(58) Field of Classification Search
CPC . F21S 6/008; F21S 8/024; F21S 8/036; F21V 7/0016; F21Y 2103/10; F21Y 2105/10
USPC .......................................................... 362/147
See application file for complete search history.

(56) References Cited

U.S. PATENT DOCUMENTS

| | | | |
|---|---|---|---|
| 5,251,116 A | 10/1993 | Wijbenga et al. | |
| 5,539,626 A * | 7/1996 | Scholz | F21V 23/04 362/237 |
| 5,546,292 A * | 8/1996 | Shemitz | F21S 8/033 362/147 |
| 5,713,657 A * | 2/1998 | Dearborn | A47H 2/00 362/147 |

(Continued)

FOREIGN PATENT DOCUMENTS

EP 2372229 B1 10/2011

OTHER PUBLICATIONS

PCT/US2018/031115 International Search Report and Written Opinion dated Jul. 16, 2018 (11 pages).

*Primary Examiner* — Matthew J. Peerce
(74) *Attorney, Agent, or Firm* — Michael Best & Friedrich, LLP (57) ABSTRACT

The disclosure is directed to an uplight assembly and a luminaire incorporating the same. The luminaire includes a housing having an upper cover at least partially defining an interior. The upper cover has an opening formed in a top wall facing a first direction. A primary light emitter is connected to the housing and facing a second direction opposite the first direction. A chassis is connected to the upper cover. A secondary light emitter is connected to the chassis. A reflector is connected to the chassis. Wherein the second light emitter and the reflector are configured to emit light through the opening.

20 Claims, 9 Drawing Sheets

(56) References Cited

U.S. PATENT DOCUMENTS

| | | | |
|---|---|---|---|
| 6,652,113 B2* | 11/2003 | Tant | F21S 8/033 |
| | | | 362/147 |
| 6,905,255 B2 | 6/2005 | Russello et al. | |
| 6,913,369 B2* | 7/2005 | Chadwick | B28B 7/346 |
| | | | 362/147 |
| 7,097,319 B2* | 8/2006 | Mauk | F21S 8/033 |
| | | | 362/147 |
| 7,874,696 B2* | 1/2011 | Engel | F21S 8/033 |
| | | | 362/147 |
| 8,282,248 B1 | 10/2012 | Burt | |
| 8,807,784 B2* | 8/2014 | Marquardt | F21S 8/06 |
| | | | 362/217.05 |
| 10,125,946 B2* | 11/2018 | Meerbeek | F21S 8/033 |
| 2015/0345743 A1* | 12/2015 | Trincia | F21V 7/0091 |
| | | | 362/223 |
| 2017/0307204 A1* | 10/2017 | Cattoni | F21S 8/036 |

* cited by examiner

LUMINAIRE UPLIGHT

RELATED APPLICATION(S)

This application is based on U.S. Provisional Application Ser. No. 62/502,190, filed May 5, 2017, the disclosure of which is incorporated herein by reference in its entirety and to which priority is claimed.

BACKGROUND

The application relates to luminaires and components for luminaires.

Light fixtures, or luminaires, include electric light sources to provide an aesthetic and functional housing in both interior and exterior applications. Wall pack luminaires may provide exterior lighting for buildings around walkways and exit doors, and may provide interior lighting near hallways, entryways, or other areas. Wall pack luminaires are typically secured to walls or other structures and provide downward light distribution from an elevated position.

SUMMARY

According to an exemplary embodiment, a luminaire includes a housing having an upper cover at least partially defining an interior. The upper cover has an opening formed in a top wall facing a first direction. A primary light emitter is connected to the housing and facing a second direction opposite the first direction. A chassis is connected to the upper cover. A secondary light emitter is connected to the chassis. A reflector is connected to the chassis. Wherein the second light emitter and the reflector are configured to emit light through the opening.

According to another exemplary embodiment, a luminaire includes a housing having an upper cover at least partially defining an interior, a top wall, and an opening formed in a top wall. The housing is configured to connect to a wall above a doorway. A primary light emitter is connected to the housing and configured to direct light to a floor of an area below the housing. An uplight assembly positioned in the housing and configured to direct light to a wall in an area above the housing. The uplight assembly includes a chassis, a reflector connected to the chassis, and a secondary light emitter.

According to another exemplary embodiment, an uplight assembly for a luminaire includes a chassis having a rear wall and an upper rim extending above and outwardly from the rear wall to define an opening. A light emitter is connected to the rear wall. A reflector is connected to the rear wall and positioned to direct light received from the light emitter through the opening. A lens is positioned over the upper rim. The chassis is configured to be positioned in a luminaire housing to provide a secondary light output.

DETAILED DESCRIPTION

Figure 1:
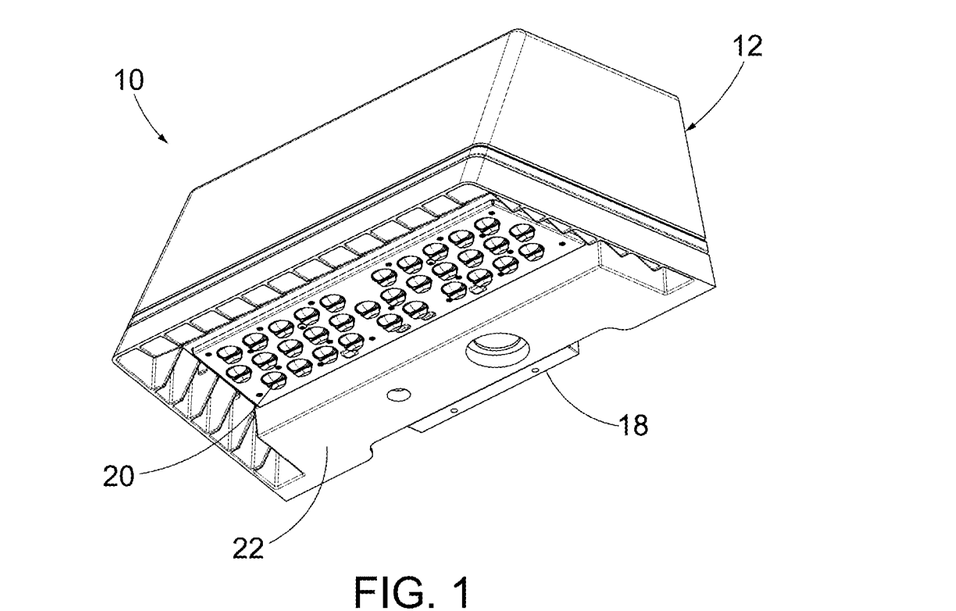
FIG. 1 is a bottom perspective view of an exemplary luminaire with an uplight assembly.
Figure 2:
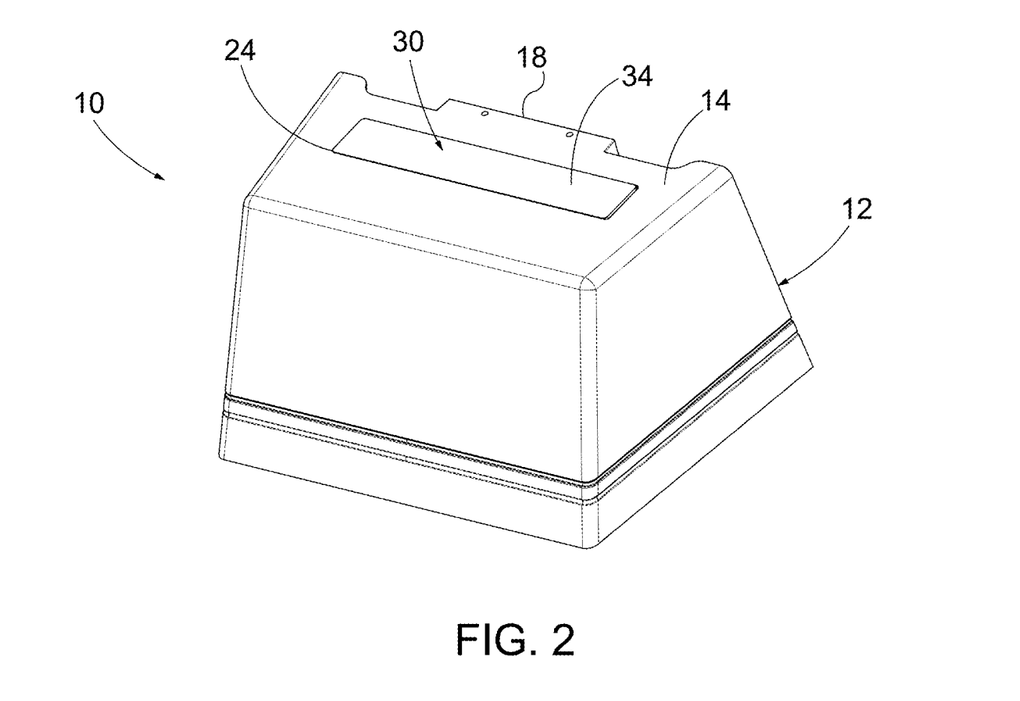
FIG. 2 is a top perspective view of FIG. 1.

Various exemplary embodiments of this application are directed to luminaire components that an accent or secondary lighting emitted from a housing. The illustrated embodiments are shown in connection with a wall-pack style luminaires that is typically mounted over an exit door. The luminaire has a main light output from the bottom of the luminaire. This application discusses components that can be used to provide accent light outputs in different directions from the main light output FIGS. 1 and 2 illustrate a wall pack luminaire including a housing 10 at least partially defined by a cover 12 with an upper wall 14 and one or more side walls 16. The illustrated housing has a substantially trapezoidal configuration. In some embodiments, the housing can have different shapes and configurations, includes round and quarter-sphere configurations. A mounting component 18 extends from the rear of the cover 12 to connect the housing 10 to a wall. The mounting component 18 can also be configured to connect the housing to pole, post, ceiling, or other structure. One or more primary light emitters 20 are connected to a base 22, or other structural component connected to the cover 12. A lens (not shown) can be positioned over the light emitters. The interior of the cover 12 can be configured to receive the primary light emitters 20 and one or more control components (e.g. drivers, fuses, surge protectors, sensors, communication modules, control modules). The luminaire is configured to have a primary light output from the primary light emitters 20 in downward direction for example a direction opposite the upper wall 14. The upper wall 14 of the cover 12 includes an opening 24 receiving a secondary light output. The opening 24 is shown as having a rectangular configuration, but different sizes, shapes, and configurations can be used.

Figure 3:
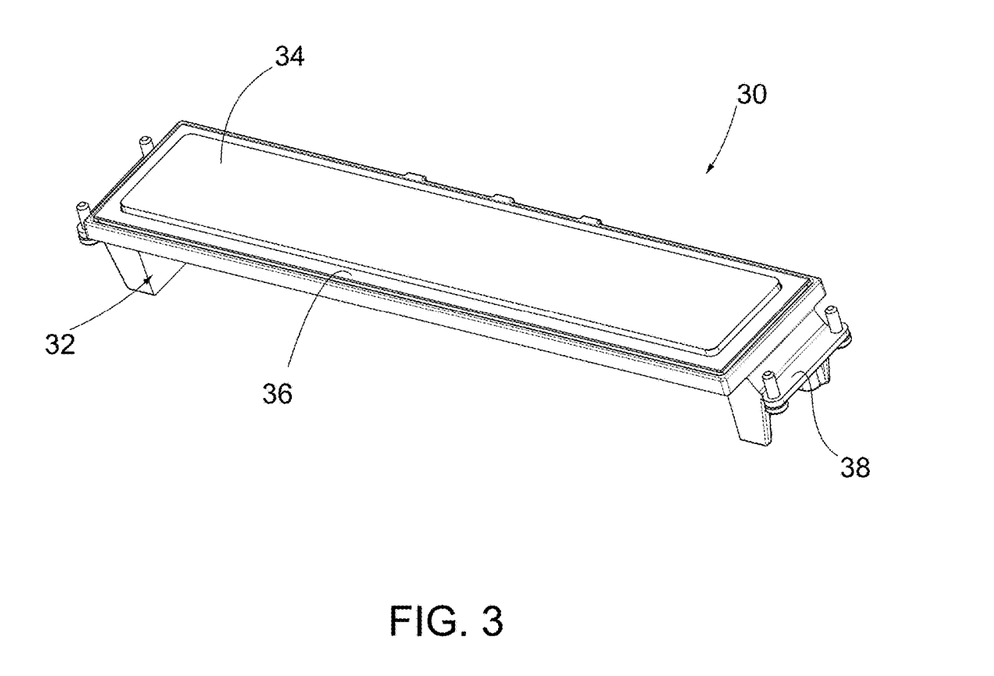
FIG. 3 is a top perspective view of the uplight assembly of FIG. 1.
Figure 4:
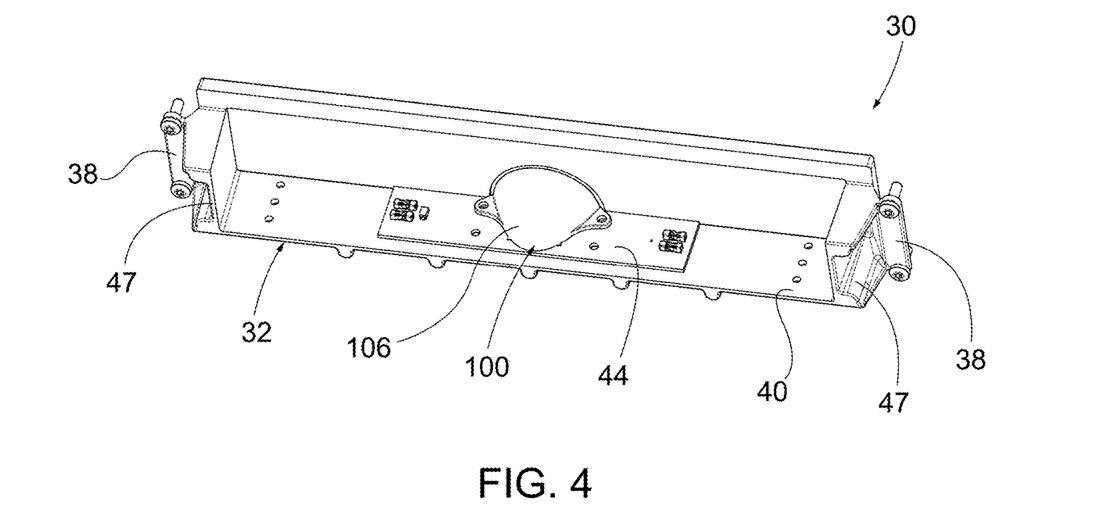
FIG. 4 is a bottom perspective view of FIG. 3.
Figure 5:
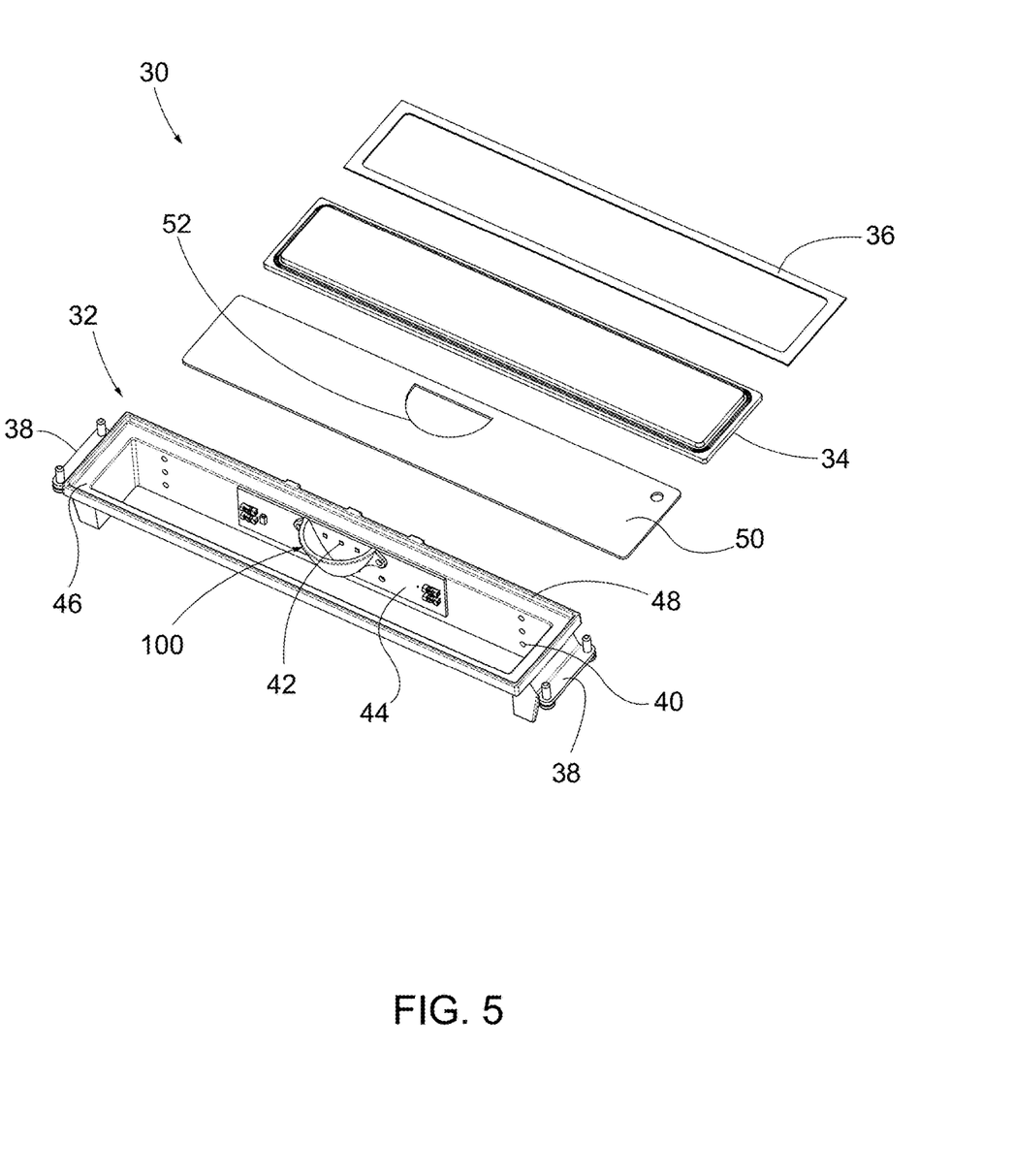
FIG. 5 is a partially exploded view of the uplight assembly of FIG. 3.

FIGS. 3-5 show an exemplary embodiment of an uplight assembly 30 that can be positioned in the housing 10, or in other luminaire housings. The uplight assembly 30 includes a chassis 32 that is positioned in the housing 10. A lens 34 is connected to the chassis 32 and is aligned with the opening 24 in the top wall of the cover. A gasket 36 can be positioned between the lens 34 and the cover 12 to prevent contaminants from entering the housing 10. The chassis 32 can include a pair of mounting brackets 38 extending from the sides of the chassis 32. The mounting brackets include a pair of openings that receive fasteners to connect the chassis 32 to the housing 10. The brackets 38 can be unitarily formed with the chassis 32.

As best shown in FIGS. 4 and 5, the chassis 32 includes a rear wall 40. One or more light emitters 42 can be connected to the rear wall 40. In an exemplary embodiment, the light emitters include LEDs that are connected to a printed circuit board 44 (PCB) that is connected to the rear wall 40. In other exemplary embodiments, the LEDs can be directly connected to the rear wall 40 or positioned in the rear wall 40. The number, size, type, intensity, and spacing of the light emitters 42 can be altered to achieve a desired light output. Different light emitter configurations can be provided on different PCB boards 44 that are selectively attached to the rear wall 40. Different reflectors can also be used to modify the light output from the light emitters.

As best shown in FIGS. 4 and 5, an upper section of the chassis 32 includes an upper rim 46 and a raised edge 48 that extends above the rear wall 44 and the recessed edge 46. A pair of side legs 47 extend from the rear wall 40 and below the upper rim 46. The upper rim 46 extends outwardly from the rear wall 40 and the legs 47, and defines an opening. The upper rim 46 and the raised edge 48 can receive a base plate 50 and the lens 34. The base plate 50 includes an opening 52 that substantially corresponds to the size and shape of the upper edge of the associated reflector. The lens 34 can be plain or it can have optical features (e.g. frosting, textured surface, prisms, etc.) that alter or condition light emitted from the light emitters 42. The lens 34 can also be used to address color mixing or color angle concerns.

Figure 6:
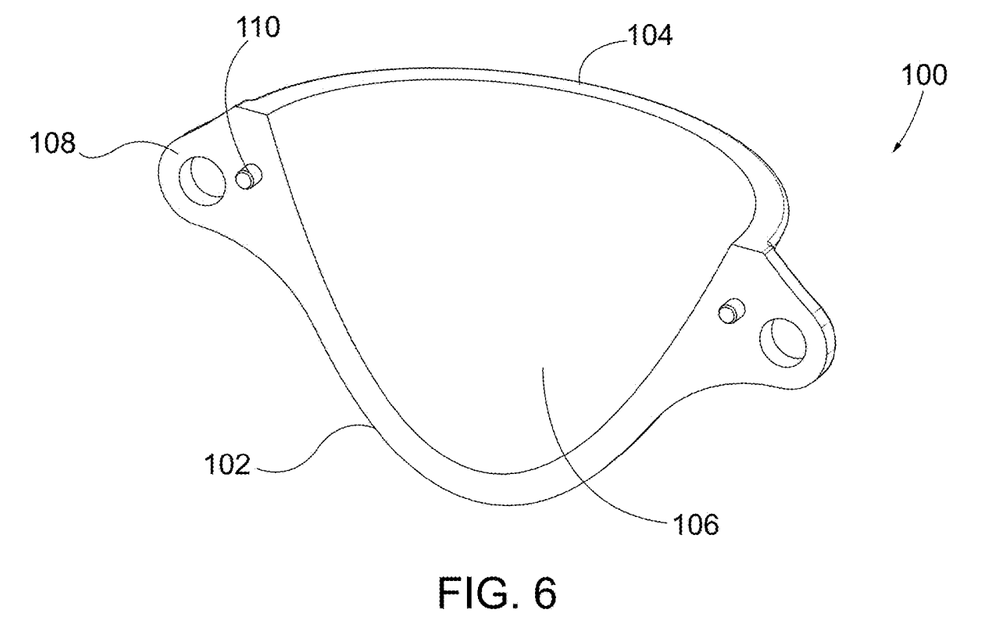
FIG. 6 is a rear perspective view of the reflector of the uplight assembly of FIG. 3.

A reflector 100 is connected to the PCB 44 or the rear wall 40 and positioned around one or more of the light emitters 42. FIGS. 4-6 show a first reflector 100. As best shown in FIG. 6, the first reflector 100 includes a first curved edge 102 facing the PCB and a second curved edge 104 that is facing the lens 34. A curved wall 106 extends from the first edge 102 and the second edge 104. The curved wall 106 can have a varied radius (e.g. parabolic) that is partially revolved around a central point as shown, or it can have a constant radius and have a semi-spherical configuration. The curved wall 106 can be smooth and continuous or it can be faceted. The curved surface can also be formed from a single sheet of material or from multiple sheets of material. The reflector 100 includes a pair of side flanges 108 and projections no that are used to connect the reflector to the rear wall 40 of the chassis 32 or to a PCB board 44 as shown. In certain embodiments, more than one reflector 100 can be used, with each reflector 100 associated with one or more light emitters 42.

Figure 7:
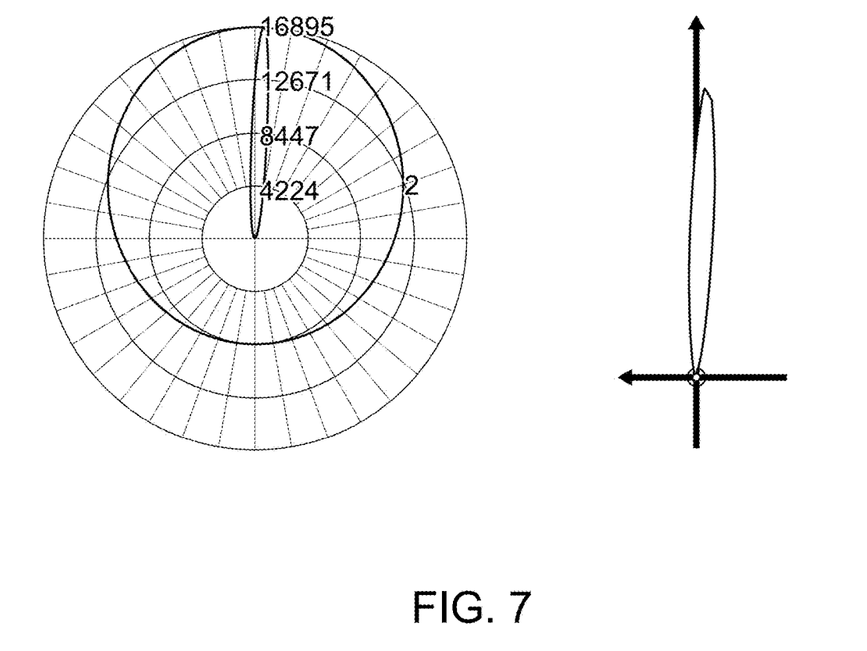
FIG. 7 is a polar plot and a candela plot of the uplight and reflector of FIG. 3.

FIG. 7 shows exemplary light distribution plots for the reflector. The light output has a substantially upward throw, with a substantially give shape projected against the wall. In this embodiment, the light emitters 42 are pointed away from the wall, directly into the reflector 100. This way, only light controlled from the reflector 100 will strike the wall. This helps eliminate stray light from disrupting the desired light pattern. Because of the relatively short distance to the wall, stray light would be highly visible.

Figure 8:
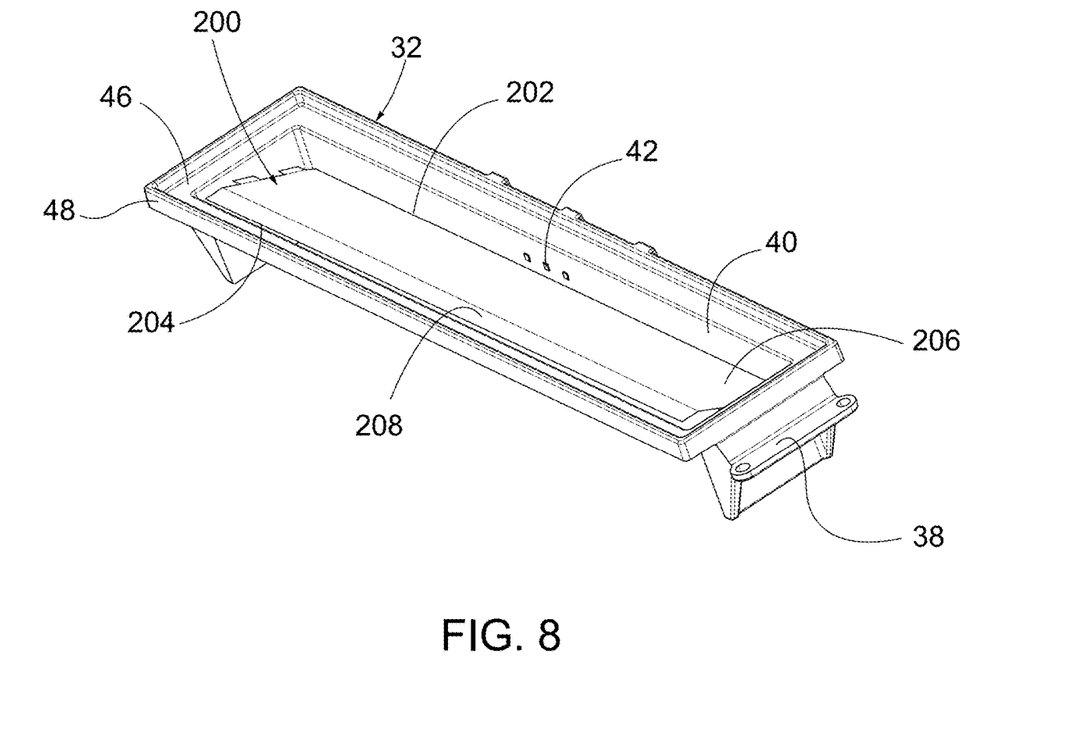
FIG. 8 is a top perspective view of an uplight assembly with a chassis, light emitter, and second reflector.
Figure 9:
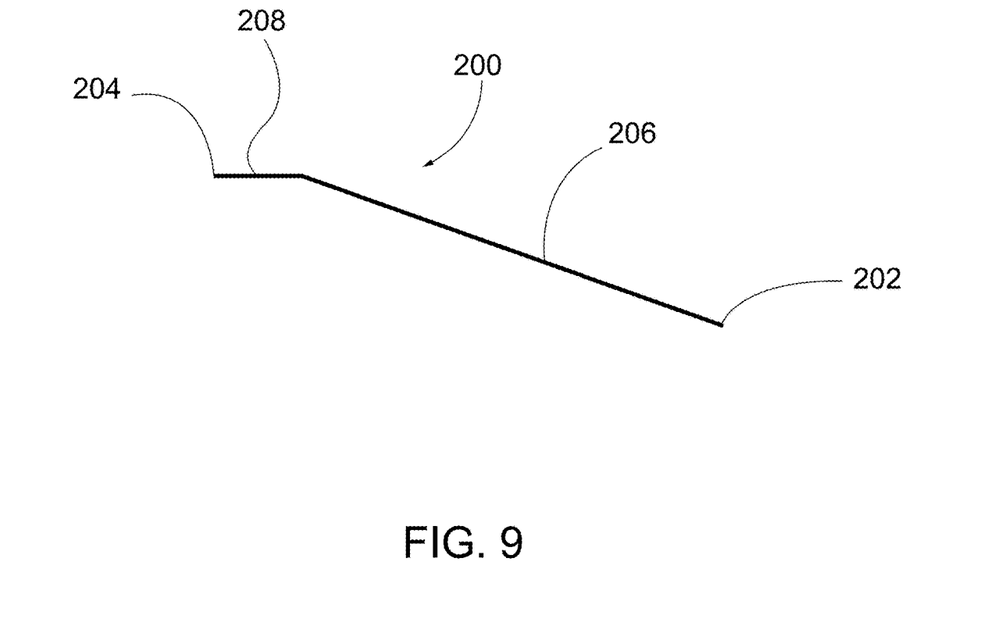
FIG. 9 is a side view of the reflector of FIG. 8.

FIGS. 8 and 9 show a second reflector 200 that extends across the interior of the chassis 32. The second reflector 200 has a first end portion 202 that is positioned proximate the rear wall 40 and a second edge 204 that is positioned proximate the front of the upper rim 46. As best shown in FIG. 9, a first portion 206 of the reflector 200 extends from the first edge 202 at an oblique angle away from rear wall 40 and toward the upper rim 46. A second portion 208 of the reflector 200 extends from the first portion 206 to the second edge 204 substantially parallel to the upper rim 46.

Figure 10:
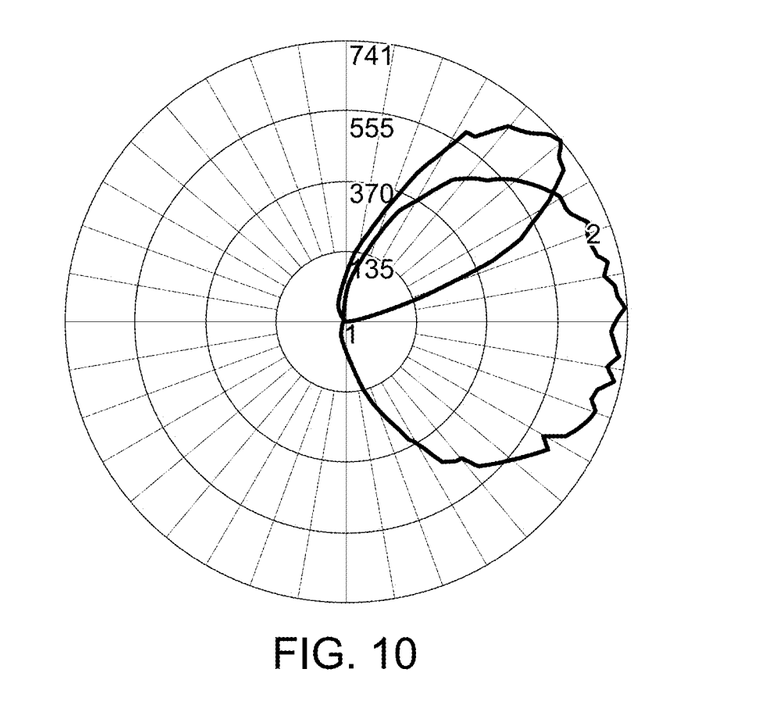
FIG. 10 is a polar plot of the uplight and reflector of FIG. 8.
Figure 11:
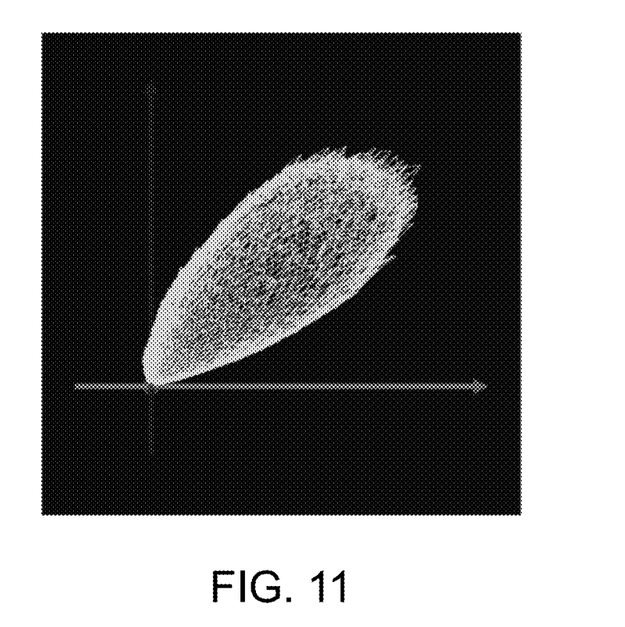
FIG. 11 is a candela plot of the uplight and reflector of FIG. 8.

FIGS. 10 and 11 show exemplary light distributions plots for the second reflector 200 and light emitter combination. As shown, the light output has a substantially upward and outward throw from the wall. In this embodiment, the light emitters are pointed in the direction of the desired main beam (down from the housing) departing from the indirect approach. This is possible because the target of illumination is not the mounting wall, but rather the ceiling or other area above the unit, greatly increasing the distance between the luminaire and the target. This minimizes the effects of distortions or pixelations that can be caused by the light emitters.

Figure 12:
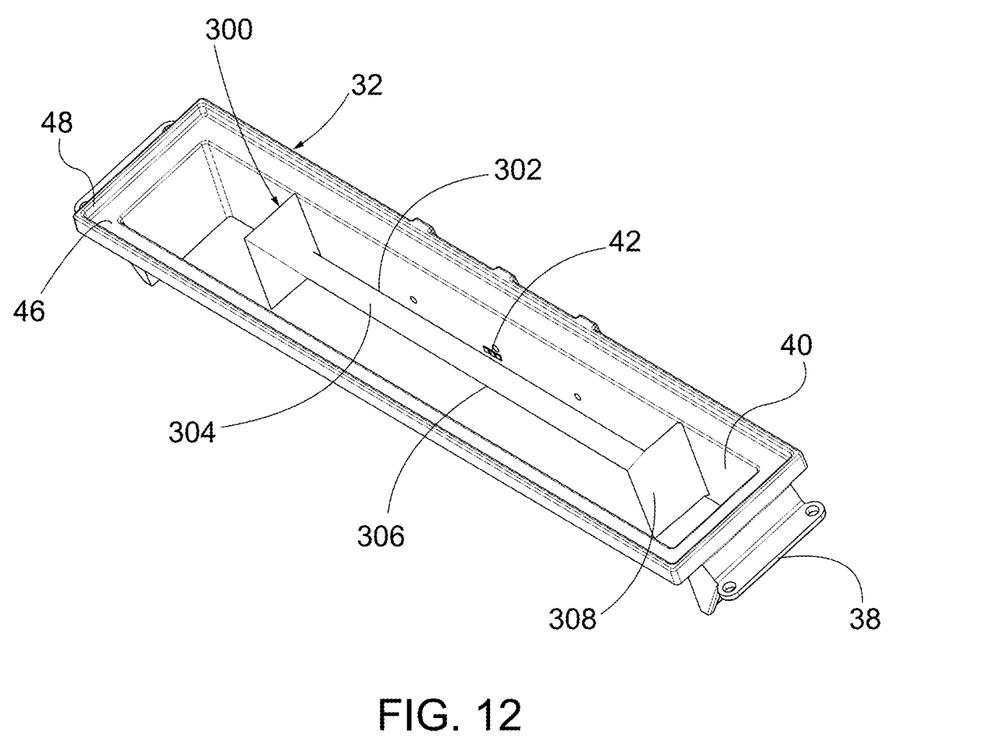
FIG. 12 is a top perspective view of an uplight assembly with a chassis, light emitter, and third reflector.
Figure 13:
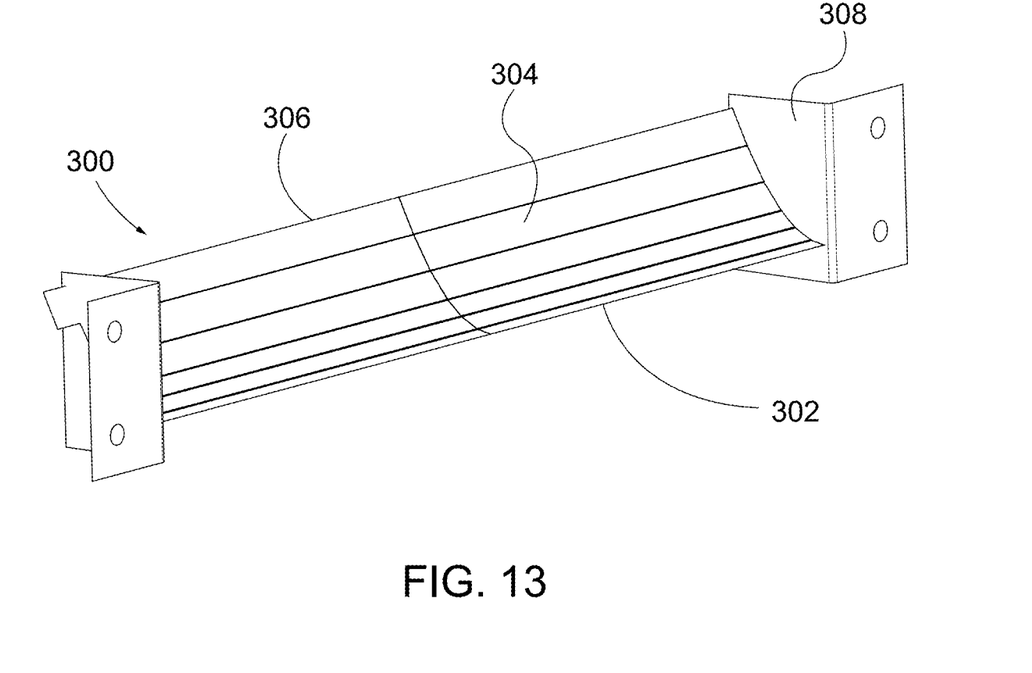
FIG. 13 is a rear perspective view of the third reflector.

FIGS. 12 and 13 show a third reflector 300 that extends across a portion of the interior of the chassis 32. The third reflector 300 has a first edge 302 that is positioned proximate the rear wall 40. A curved surface 304 extends from the first edge 302 to a second edge 306. The curved surface 304 is concave relative to the direction of the light output and can have a varied radius (e.g. parabolic) as shown, or it can have a constant radius. The curved surface can be smooth and continuous or it can be faceted. The curved surface can also be formed from a single sheet of material or from multiple sheets of material. The second reflector can be connected to the chassis by a pair of side flanges having one or more openings for receiving fasteners. Other connections can be used, such as snap-fit or interference fit connections.

Figure 14:
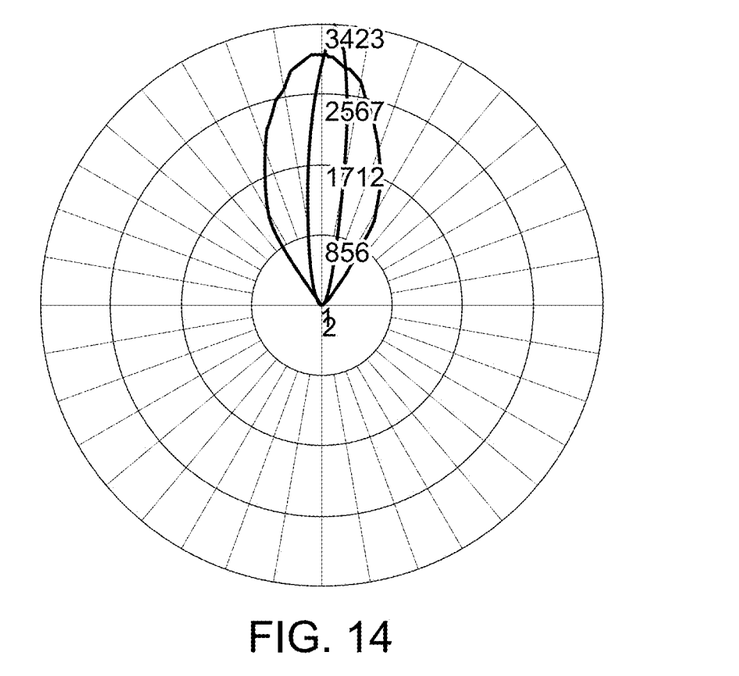
FIG. 14 is a polar plot of the uplight and reflector of FIG. 12.
Figure 15:
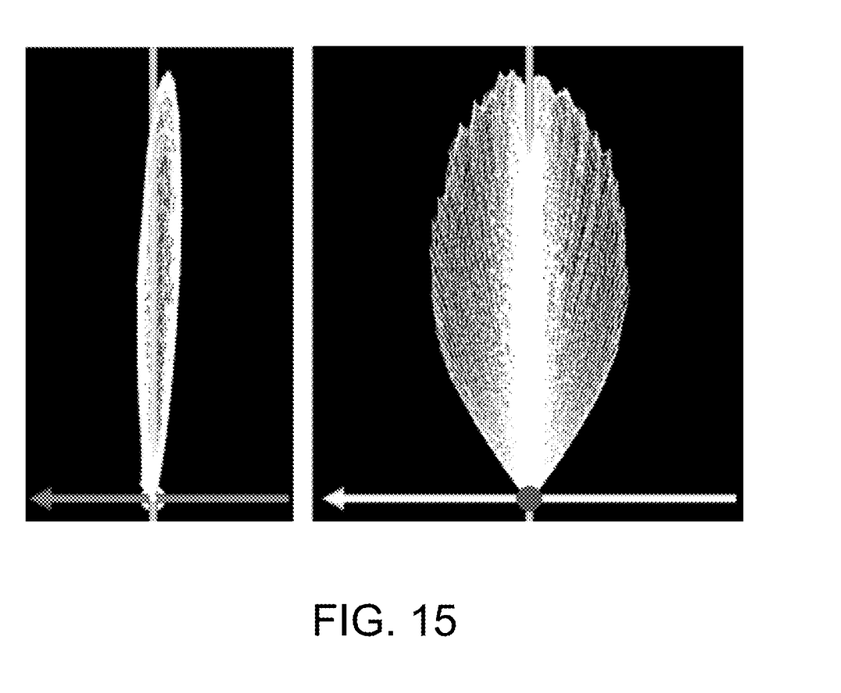
FIG. 15 is a candela plot of the uplight and reflector of FIG. 12.

FIGS. 14 and 15 show exemplary light distribution plots for the third reflector 300. The light output has a substantially upward throw, with a substantially spatulate shape projected against the wall. In this embodiment, the light emitters are pointed away from the wall, directly into the reflector. This way, only light controlled from the reflector will strike the wall. This helps eliminate stray light from disrupting the desired light pattern. Because of the relatively short distance to the wall, stray light would be highly visible.

Figure 16:
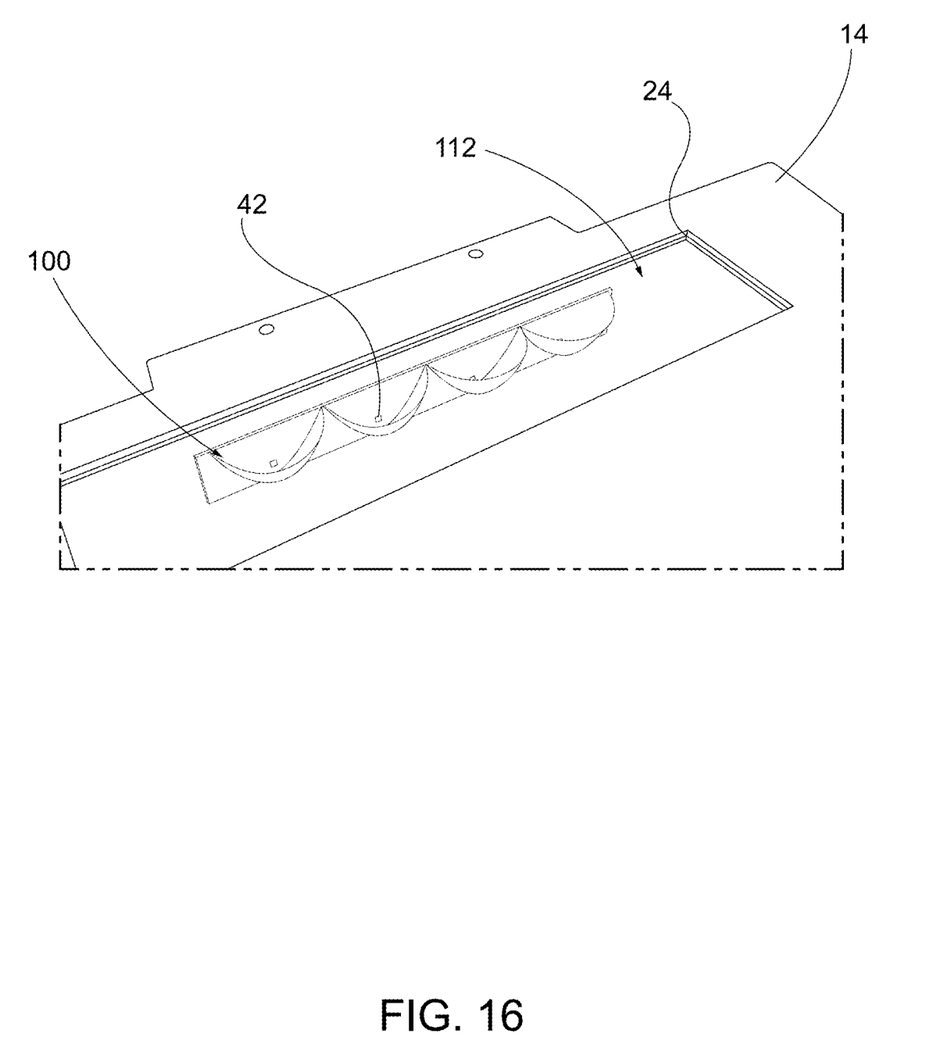
FIG. 16 is a top perspective view of the chassis, an array of the first reflectors, and a diffuser lens connected to the cover.

FIG. 16 shows an exemplary embodiment of a series of the first reflectors 100 positioned adjacent one another and each associated with a single light emitter 42. A diffuser lens 112 positioned below the lens 34. The diffuser lens 112 can help widen the light output, creating a distribution similar to what is shown in FIGS. 14 and 15.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Modifications may be made to adapt a particular situation or material to the teachings of the disclosure without departing from the scope thereof. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A luminaire comprising:
    a housing including an upper cover at least partially defining an interior, the upper cover having an opening formed in a top wall facing a first direction;
    a primary light emitter connected to the housing and facing a second direction opposite the first direction;
    a chassis connected to the upper cover;
    a secondary light emitter connected to the chassis, the secondary light emitter facing a third direction generally orthogonal to the first and second directions;
    a reflector connected to the chassis, the reflector having an upper edge; and
    a base plate positioned between the reflector and the opening and having an aperture that substantially corresponds to the reflector upper edge,
    wherein the second light emitter and the reflector are configured to emit light through the opening.

2. The luminaire of claim 1, wherein the primary light emitter is configured to direct light to a floor of an area below the housing and the secondary light emitter is configured to direct light to an area above the housing.

3. The luminaire of claim 1, wherein the lumen output from the primary light emitter is higher than the lumen output of the second light emitter.

4. The luminaire of claim 1, further comprising a lens positioned in the opening formed in the top wall and a gasket positioned between the lens and the top wall.

5. The luminaire of claim 1, wherein the chassis includes a mounting bracket configured to receive a fastener to connect the chassis to the top wall.

6. The luminaire of claim 1, wherein the reflector includes a curved wall having a varied radius.

7. The luminaire of claim 6, wherein the reflector includes a first curved edge facing away from the top wall and a second curved edge facing the top wall.

8. The luminaire of claim 1, wherein the chassis includes a rear wall that receives the secondary light emitter and the reflector, and an upper rim extending from the rear wall and receiving the base plate.

9. The luminaire of claim 8, wherein the reflector includes a first edge proximate the rear wall, a second edge proximate the upper rim, a first portion extending at an oblique angle from the upper wall and a second portion substantially parallel to the upper rim.

10. A luminaire comprising:
    a housing including an upper cover at least partially defining an interior, a top wall, and an opening formed in a top wall, wherein the housing is configured to connect to a wall above a doorway;
    a primary light emitter connected to the housing and configured to direct light in a first direction to a floor of an area below the housing; and
    an uplight assembly positioned in the housing and configured to direct light to a wall in an area above the housing, the uplight assembly including a chassis having a rear wall with a face generally planar with a plane extending in the first direction, a reflector connected to the chassis, a secondary light emitter coupled to the face, and a base plate positioned between the reflector and the opening,
    wherein the reflector has an upper edge and the base plate includes an aperture that substantially corresponds to the reflector upper edge.

11. The luminaire of claim 10, wherein the uplight assembly includes a lens connected to the chassis.

12. The luminaire of claim 10, wherein the chassis includes a mounting bracket configured to receive a fastener to connect the chassis to the housing.

13. The luminaire of claim 10, wherein the reflector includes a curved wall having a varied radius.

14. The luminaire of claim 10, wherein the rear wall receives the reflector, an upper rim extending from the rear wall, and a raised edge extending from the upper rim.

15. The luminaire of claim 14, wherein the reflector includes a first edge proximate the rear wall, a second edge proximate the upper rim, a first portion extending at an oblique angle from the upper wall and a second portion substantially parallel to the upper rim.

16. An uplight assembly for a luminaire comprising:
    a chassis having a rear wall and an upper rim extending above and outwardly from the rear wall to define an opening;
    a light emitter connected to the face of the rear wall;
    a reflector connected to the rear wall and positioned to direct light received from the light emitter through the opening, the reflector having an upper edge;
    a base plate positioned on the upper rim having an aperture that substantially corresponds to the reflector upper edge; and
    a lens positioned over the upper rim,
    wherein the chassis is configured to be positioned in a luminaire housing to provide a secondary light output.

17. The uplight assembly of claim 16, wherein the chassis includes a leg extending beneath the upper rim and a mounting bracket extending from the leg.

18. The uplight assembly of claim 16, wherein the reflector includes a curved wall having a varied radius.

19. The uplight assembly of claim 18, wherein the reflector includes a first curved edge facing away from the top wall and a second curved edge facing the top wall.

20. The uplight assembly of claim 16, wherein the reflector includes a first edge proximate the rear wall, a second edge proximate the upper rim, a first portion extending at an oblique angle from the upper wall and a second portion substantially parallel to the upper rim.

* * * * *